United States Patent
Panier et al.

(10) Patent No.: US 11,608,294 B2
(45) Date of Patent: Mar. 21, 2023

(54) OXY-CALCINATION PROCESS

(71) Applicant: L'Air Liquide, Societe Anonyme pour l'Etude et l'Exploitation des Procedes Georges Claude, Paris (FR)

(72) Inventors: Faustine Panier, Jouy-en-Josas (FR); Xavier Paubel, Montigny le Bretonneux (FR); Carlo Renna, Maule (FR); Michel Gimenez, Diemoz (FR); Colin Paxton, Kent (GB); Henrik Wassard, Bagsvaerd (DK); Morten Drivsholm, Blokhus (DK); Remi Tsiava, Saint Germain-Ies-Corbeil (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 182 days.

(21) Appl. No.: 16/825,735

(22) Filed: Mar. 20, 2020

(65) Prior Publication Data
US 2020/0216357 A1  Jul. 9, 2020

Related U.S. Application Data

(62) Division of application No. 15/532,325, filed as application No. PCT/EP2015/078100 on Nov. 30, 2015, now Pat. No. 10,633,282.

(30) Foreign Application Priority Data

Dec. 1, 2014 (EP) ..................................... 14306933

(51) Int. Cl.
C04B 7/43 (2006.01)
F27B 7/20 (2006.01)
(Continued)

(52) U.S. Cl.
CPC .............. *C04B 7/434* (2013.01); *B01D 45/16* (2013.01); *B01D 53/96* (2013.01); *C04B 2/10* (2013.01);
(Continued)

(58) Field of Classification Search
CPC ........... C04B 7/434; C04B 2/10; B01D 45/16; B01D 53/96; F27B 7/20; F27B 7/2033; F27B 17/004
See application file for complete search history.

(56) References Cited

FOREIGN PATENT DOCUMENTS

EP          1923367 A1 *  5/2008  ............. C04B 7/367

OTHER PUBLICATIONS

"IEAGHG Information Paper," 2014-IP7: Pilot Plant Trial of Oxy-Combustion at a Cement Plant, May 22, 2014; Retrieved from Internet: URL:http://ieaghg.org/docs/Gemeral_Docs/Publications/Information_Papers/2014-IP7.pdf.‡

(Continued)

*Primary Examiner* — James A Fiorito
(74) *Attorney, Agent, or Firm* — Christopher J. Cronin

(57) ABSTRACT

Method and installation for calcining cement raw meal in a calciner whereby fuel and a calciner oxidant having an oxygen content of at least 30% vol are introduced into the calciner so as to generate either an oxidant-lean zone or a fuel-lean zone in the calciner located between the lowermost fuel inlet level and the lowermost oxidant inlet level of the calciner, between 50% and 100% by weight of the raw meal being supplied to the calciner upstream of and/or within the oxidant-lean, respectively the fuel-lean zone.

4 Claims, 2 Drawing Sheets

(51) Int. Cl.
*F27D 17/00* (2006.01)
*B01D 45/16* (2006.01)
*B01D 53/96* (2006.01)
*C04B 2/10* (2006.01)
*C01B 32/50* (2017.01)

(52) U.S. Cl.
CPC .............. *F27B 7/20* (2013.01); *F27B 7/2033* (2013.01); *F27D 17/004* (2013.01); *C01B 32/50* (2017.08); *Y02P 40/18* (2015.11)

(56) References Cited

OTHER PUBLICATIONS

Barker, et al., "C02 Capture in the Cement Industry," Energy Procedia, Elsevier, NL, vol. 1, No. 1, Feb. 1, 2009, pp. 87-94.‡
"C02 Capture Technologies—Oxy Combustion with C02 Capture," Jan. 1, 2012; Retrieved from the Internet: URL: http://www.globalccsinstitute.com/sites/defaut/files/publications/29761/co2-capture-technologies-oxy-combustion. pdf.‡
Gimenez, M., et al., "The Oxycombustion Option," International Cement Review, vol. 37, May 2014, p. 38, col. 3; p. 40, col. 2.‡
International Search Report and Written Opinion for PCT/EP2015/078100 dated Feb. 24, 2016.‡
"IEAGHG Information Paper," 2014-IP7: Pilot Plant Trial of Oxy-Combustion at a Cement Plant, May 22, 2014; Retrieved from Internet: URL:http://ieaghg.org/docs/Gemeral_Docs/Publications/lnformation_Papers/2014-IP7.pdf.
"CO2 Capture Technologies—Oxy Combustion with CO2 Capture," Jan. 1, 2012; Retrieved from the Internet: URL:http://www.globalccsinstitute.com/sites/default/files/publications/29761/co2-capture-technologies-oxy-combustion.pdf.
Barker, et al., "CO2 Capture in the Cement Industry," Energy Procedia, Elsevier, NL, vol. 1, No. 1, Feb. 1, 2009, pp. 87-94.

\* cited by examiner
‡ imported from a related application

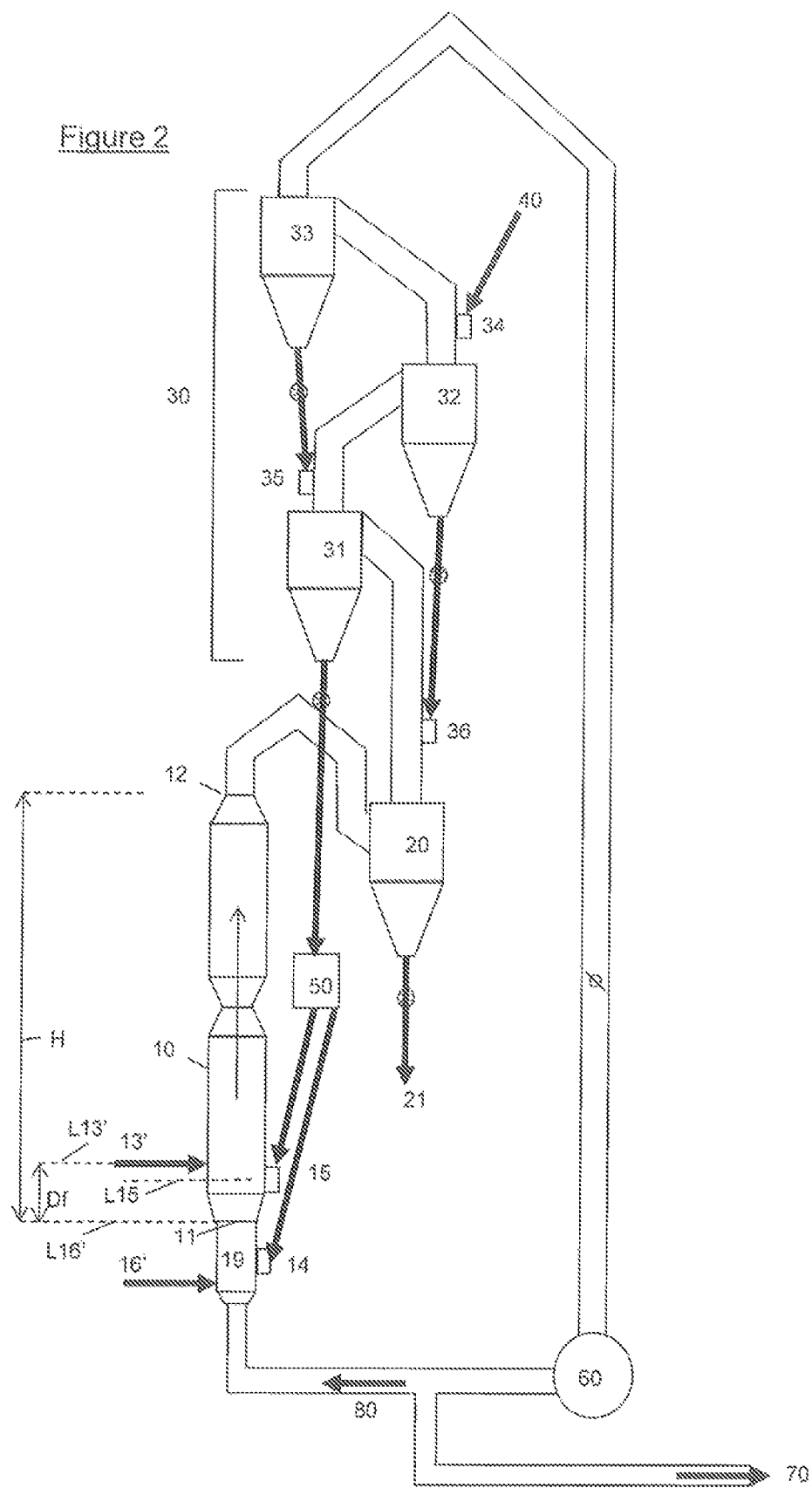

OXY-CALCINATION PROCESS

CROSS-REFERENCE TO RELATED APPLICATIONS

This application is a Divisional of U.S. patent application Ser. No. 15/532,325, filed Jun. 1, 2027, which is a § 371 of International PCT Application PCT/EP2015/078100, filed Nov. 30, 2015, which claims § 119(a) foreign priority to EP patent application EP14306933.4, filed Dec. 1, 2014, all of which are incorporated herein by reference.

BACKGROUND

Field of the Invention

The present invention relates to the calcination of raw cement meal using oxy-combustion, the calcination of raw meal being an essential step in the production of cement clinker.

Related Art

The cement industry is an important emitter of the greenhouse gas $CO_2$.

Within the cement production process, significant amounts of $CO_2$ are more particularly generated during the decarbonation of raw meal ($CaCO_3$) to lime ($CaO$) via the following reversible equilibrium reaction:

$$CaCO_3 \xrightleftharpoons{K} CaO + CO_2$$

$\Delta H \approx 1800 \text{ kJ/kg}$ $K = A\exp\left(\frac{-E_a}{RT}\right),$ so that about 80% of the $CO_2$ generated by a cement plant is produced at calciner level.

As explained in the article "The oxycombustion option" published in the May 2014 issue of the INTERNATIONAL CEMENT REVIEW 37, the cement industry has made considerable efforts to lower its $CO_2$ emissions through the use of alternative fuels, lower specific heat consumption in kiln systems and a decrease of the clinker factor with the addition of supplementary cementitious materials leading to $CO_2$ reduction by 20-30%.

A possible route for further $CO_2$ mitigation lies in the application of carbon capture and storage technology (CCS) or carbon capture, storage and utilization technology (CCSU). This entails capturing $CO_2$ from the cement plant's flue gases for storage or for use in other industrial applications.

The air used in conventional combustion processes consists mainly of nitrogen (about 78% vol), said nitrogen also forming the main constituent of the flue gas generated by air-combustion.

Several technologies have been developed to extract and capture $CO_2$ from such flue gases, in particular for the power industry.

The current reference technology for capturing $CO_2$ present in flue gases is amine scrubbing.

This process consists of extracting the $CO_2$ fraction from a post-combustion flue gas by flushing the gases with an amine sorbent, regenerating the solvent by steam stripping, thus releasing nearly pure $CO_2$, and recycling the stripped solvent to the absorber. Although this technology is very efficient, it is also quite expensive.

An alternative to post-combustion amine scrubbing is the use of oxycombustion.

In the oxycombustion process oxygen and recycled flue gas replace the conventional combustion air, so as to directly generate a $CO_2$-rich flue gas during combustion and thereby to reduce downstream $CO_2$ purification costs.

In a cement plant, oxycombustion can be applied either to the full production line (i.e. in both the calciner and rotary kiln section), such a process being referred to as "full oxy-firing", or solely at the calciner stage, referred to as "partial oxy-firing". In the comparative study "$CO_2$ Capture in the cement Industry", Report no 2008/3, published by the International Energy Agency (IEA), it was concluded that partial oxy-firing is the most cost-effective and lowest-risk configuration for retrofitting an existing cement plant. The IEA report also concluded that partial oxy-firing was cheaper than post-combustion amine scrubbing technology.

However, operating a calciner in oxycombustion mode has a major impact on the abovementioned decarbonation reaction because of the increase in $CO_2$ partial pressure. Indeed, the desired decarbonation reaction only occurs if the equilibrium pressure—which strongly depends on the temperature—exceeds the surrounding $CO_2$ partial pressure.

In order to counteract the high $CO_2$ content linked to oxycombustion, it would therefore be necessary to operate the calciner at higher average temperature.

In calciners operating with air-combustion, the atmosphere contains typically from 25% vol to a maximum of 35% vol $CO_2$. The corresponding equilibrium temperature of the decarbonation reaction is in the range of 800° C. to 850° C. According to the abovementioned study "$CO_2$ Capture in the cement Industry", the switch from air-combustion to oxy-combustion in a calciner would require a calciner temperature increase of around 80° C. to compensate for the increase in $CO_2$ partial pressure.

As recognized in the article "The oxycombustion option", operating the calciner at higher average temperatures entails an increased risk of hotspots within the calciner, even more so as burning fuel with oxygen is known to generate high-temperature product gases.

Such hotspots are responsible for disruptive material build-ups within the calciner leading to costly calciner shutdowns, the alternative being to operate the calciner at lower temperature, which would result in a significant deterioration of the process efficiency (lower calcination degree). This problem is even more manifest when fuels, such as petcoke, are used which require high temperatures and high residence times in order to achieve substantially complete combustion. Such fuels are frequently used in the cement industry in order to lower production costs.

SUMMARY OF THE INVENTION

It is an aim of the present invention to at least partially overcome the abovementioned problems.

The invention aims in particular to provide a method of calcining cement raw meal in a calciner using oxy-combustion and which permits simultaneously to achieve a sufficient level of calcination and to reduce or even to avoid the occurrence of detrimental build-ups in the calciner.

The calciner extends between a bottom end and a top end in a longitudinal direction, said longitudinal direction being typically vertical or substantially vertical.

Fuel and calciner oxidant are introduced into the calciner. The fuel is burnt with the calciner oxidant to generate heat inside the calciner. The calciner oxidant has an oxygen content of between 30 and 100% vol.

The calciner oxidant advantageously has an oxygen content of at least 50% vol, preferably of at least 88% vol.

The fuel and calciner oxidant are introduced into the calciner so as to ensure substantially complete and preferably complete combustion of said fuel and, preferably, so as to minimize excess oxygen in the flue gas at the calciner outlet, taking into account any air ingress into the calciner. The amount of oxygen, referred to as excess oxygen, present in the calciner flue gas is typically maintained below 7% vol, preferably below 5% vol.

Fuel combustion is said to be substantially complete when the organic carbon content of the calcined meal is less than 0.5% by weight.

Raw meal is likewise supplied to the calciner. Within the calciner, the raw meal is entrained towards the top end by an upward gas flow.

The raw meal is calcined in the calciner and the calcined meal thus obtained is evacuated from the calciner at the top end together with the calciner flue gas.

The upward gas flow which entrains the raw meal typically comprises: the flue gases generated by the burning of the fuel with the calciner oxidant the decarbonation gas generated by the calcination of the raw meal and which consists essentially of $CO_2$ and part of the calciner flue gas which is introduced into the calciner via the bottom end as recycle flue gas.

Once evacuated from the calciner, the calcined meal is separated from the calciner flue gas. Part of the separated calciner flue gas is, as described above, introduced into the calciner as the recycle flue gas.

The calciner oxidant is introduced into the calciner at at least one oxidant inlet level. The fuel is introduced into the calciner at at least one fuel inlet level.

The at least one oxidant inlet level may consist of a single oxidant inlet level which is then referred to as "the lowermost oxidant inlet level".

Alternatively, the at least one oxidant inlet level may consist of multiple oxidant inlet levels along the longitudinal direction of the calciner, the oxidant inlet level nearest to the bottom end of the calciner being then referred to as "the lowermost oxidant inlet level".

Likewise, the at least one fuel inlet level may consist of a single fuel inlet level which is then referred to as "the lowermost fuel inlet level".

Alternatively, the at least one fuel inlet level may consist of multiple fuel inlet levels along the longitudinal direction of the calciner, the fuel inlet level nearest to the bottom end of the calciner being then referred to as "the lowermost fuel inlet level".

In accordance with the present invention, between 50% and 100% by weight of the raw meal is supplied to the calciner in a zone of limited or even no fuel combustion.

This is achieved according to one of the following options:

option 1: the lowermost oxidant inlet level is located downstream (in terms of the upward gas flow) of the lowermost fuel inlet level and this at an oxygen-lean zone distance $Do(>0)$ from the lowermost fuel inlet level thereby creating an oxygen-lean zone in the calciner, at least 50% by weight of the raw meal being supplied to the calciner upstream of and/or at the lowermost oxidant inlet level, preferably at least 85% by weight of the raw meal;

or option 2: the lowermost fuel inlet level is located downstream (in terms of the upward gas flow) of the lowermost oxidant inlet level and this at a fuel-lean zone distance $Df(>0)$ from the lowermost oxidant inlet level thereby creating a fuel-lean zone in the calciner, at least 50% by weight of the raw meal being supplied to the calciner upstream of and/or at the lowermost fuel inlet level, preferably at least 85% by weight of the raw meal.

Option 1 is generally preferred.

When fuel or calciner oxidant is mixed with the recycle flue gas before the latter is introduced into the calciner, for example inside the riser duct, said fuel, respectively calciner oxidant, is entrained by the recycle flue gas and enters the calciner via the bottom end together with the recycle flue gas. In that case, the level of the calciner bottom end corresponds to the lowermost fuel inlet level, respectively the lowermost oxidant inlet level.

In the context of the description of the present invention, the terms "downstream" and "upstream" are to be interpreted with respect to the upward gas flow in the calciner. "Downstream" thus refers to a higher level in the calciner (as seen in the longitudinal direction) and "upstream" to a lower level in the calciner.

In the method according to the first option, at least 50% by weight of the raw meal is advantageously supplied to the calciner upstream of the lowermost oxidant inlet level, preferably at least 75% by weight or even at least 85% by weight.

Likewise, in the method according to the second option at least 50% by weight of the raw meal is advantageously supplied to the calciner upstream of the lowermost fuel inlet level, preferably at least 75% by weight or even at least 85% by weight.

It was surprisingly found that, whereas detrimental build-ups of material were rapidly observed within the calciner for other configurations of meal, fuel and calciner oxidant introduction into the calciner, this was not the case for the configurations of meal, fuel and calciner oxidant introduction in accordance with the invention.

It was more specifically found that, with the configurations of meal, fuel and calciner oxidant introduction of the invention, the higher the portion of raw meal injected at and/or (preferably) upstream of the lowermost oxidant inlet level (option 1), respectively fuel inlet level (option 2), the more the formation of build-ups in the calciner was inhibited. Typically, the raw meal introduced into the calciner consists at least in part of raw meal preheated in a preheater. Preferably all of the raw meal introduced into the calciner has been preheated in a preheater. Further details regarding how raw meal may be preheated are provided below.

The oxygen-lean zone distance Do, respectively the fuel-lean zone distance Df is advantageously between $1/10$ and $4/10$ of the total calciner height, said distance being more preferably between $2/10$ and $3/10$ of the total calciner height.

The oxygen-lean zone, respectively the fuel-lean zone is advantageously located in the lowermost half, preferably in the lowermost third of the calciner, i.e. in the half or third of the calciner including the bottom end.

One or more than one oxidant inlets maybe located at the lowermost oxidant inlet level.

When at the lowermost oxidant inlet level, at least part of the calciner oxidant is introduced through a plurality of oxidant inlets, said oxidant inlets being hereafter referred to as "first oxidant inlets", then said first oxidant inlets are advantageously radially spaced apart from one another around the longitudinal direction of the calciner and are preferably evenly distributed around said longitudinal direction.

When at the lowermost fuel inlet level, fuel is introduced into the calciner via a multitude of fuel inlets, then said "first fuel inlets" are likewise advantageously radially spaced apart from one another around the longitudinal direction, preferably evenly distributed around said longitudinal direction.

In many instances, the calciner operation can be improved and the risk of detrimental material build-ups can be further reduced by introducing calciner oxidant at multiple oxidant inlet levels, in particular in connection with option 1 of the present invention. In this manner, heat generation by combustion in the calciner is staged.

In that case, the calciner oxidant is divided in a first portion and a second portion of calciner oxidant. The first portion of calciner oxidant is introduced into the calciner at the lowermost oxidant inlet level through one or more first oxidant inlets. The second portion of the calciner oxidant is introduced into the calciner at one or more second oxidant inlet levels above the lowermost oxidant inlet level through one of more "second oxidant inlets" at each second oxidant inlet level.

When the second portion of calciner oxidant is introduced into the calciner through multiple second oxidant inlets:
  at least some of said second oxidant inlets may be spaced apart from one another in the longitudinal direction of the calciner, i.e. may be located at different second oxidant inlet levels; and/or
  at least some of said second oxidant inlets may be spaced apart from one another radially, i.e. with multiple second oxidant inlets at a given second oxidant inlet level being radially spaced apart around said longitudinal direction, preferably evenly so.

The considerations presented above with respect to the calciner oxidant also apply to the fuel that is supplied to the calciner when said fuel introduced into the calciner at multiple fuel inlet levels, in particular in the case of the embodiment according to option 2.

It will be appreciated that a cement production installation may also comprise additional equipment such as a second preheater. For example, in a second raw meal preheater, the raw meal can be preheated by means of flue gas coming from the rotary kiln. The process according to the present invention requires that at least one, but not necessary all, calciners is operated as described above.

The fuel introduced into the calciner may include a combination of different types or qualities of fuel.

Compared to calciners operated with air as the calciner oxidant, the method according to the present invention directly generates a $CO_2$-rich flue gas which leaves the calciner at its top end. As a result, the recycle flue gas contains at least 40% by dry volume of $CO_2$, preferably at least 60% and more preferably at least 75% by dry volume.

The portion of the calciner flue gas which is introduced into the calciner as recycle flue gas depends inter alia on the amount of flue gas which is required to generate an upward gas flow in the calciner which is sufficient for entraining the raw meal to the top end of the calciner while also ensuring a residence time of the fuel sufficient to achieve complete or substantially complete fuel combustion. In practice, achieving proper burn-out of the fuel within the calciner is often the most critical factor and the amount of recycle flue gas is advantageously at or near the minimum level of recycle flue gas necessary for entraining the raw meal to the top end of the calciner.

In doing so, the residence time of the raw meal in the calciner is generally such that the required level of decarbonation is reached. The recycle flue gas typically corresponds to between 10% vol and 80% vol, preferably between 30% vol and 50% vol of the total calciner flue gas.

The calciner flue gas evacuated from the top end of the calciner is advantageously introduced into a raw meal preheater, such as, for example, a single or multistage cyclone preheater, before part of it is recycled to the calciner as recycle flue gas.

It will be appreciated that the cement production installation may comprise additional equipment such as a second preheater.

The recycle flue gas is usefully introduced into the calciner at a temperature of at least 400° C., preferably of at least 700° C. and more preferably of at least 900° C. As a consequence, in particular when the calciner flue gas has gone through a raw meal preheater before part of it is recycled, resulting in a lowering of the flue gas temperature, the recycle flue gas may itself be (pre)heated before being introduced into the calciner.

The portion of the calciner flue gas which is not recycled to the calciner is typically subjected to a purification process to extract constituents other than $CO_2$ therefrom so as to enable the valorization or sequestration/storage of the $CO_2$ present within said non-recycled portion of the calciner flue gas, thereby reducing the $CO_2$ emissions of the cement production process.

It is an advantage of the present invention that largely pure $CO_2$ can be obtained from the non-recycled portion of the calciner flue gas using purification methods other than the relatively expensive amine scrubbing technology. As indicated above, following the purification process, the purified calciner flue gas may be stored and/or used as $CO_2$ in an industrial process.

The present invention also relates to the use of the present method of calcining cement raw meal in the production of cement clinker.

The present invention thus also covers a method of producing cement clinker whereby raw meal is calcined by the method according to the invention and whereby the calcined meal is introduced into a kiln and subjected to clinkerisation within the kiln, the kiln being typically a rotary kiln.

According to one embodiment of the cement production method according to the invention (a) the kiln gas outlet is not connected to the bottom end of the calciner but for example to another preheater tower and (b) combustion takes place in the kiln with a kiln oxidant having an oxygen content of less than 30% vol, such as air and in particular air coming from a clinker cooler.

According to an alternative embodiment combustion takes place in the kiln with a kiln oxidant having an oxygen content of between 30% vol and 100% vol, preferably of at least 50% vol and more preferably of at least 88% vol. In this case the kiln gas outlet may be connected to the bottom end of the calciner. In particular, all or part of the calciner flue gas which is introduced into the calciner as recycle flue gas may then first be injected into the kiln, for example via the clinker cooler, and thereafter introduced into the calciner as part of the kiln flue gas. In this manner, the recycle flue gas is also preheated during its passage through the clinker cooler.

The present invention also relates to a calcination installation for use in the calcination method according to the invention. Such a calcination installation for calcining cement raw meal comprises a calciner which has a total calciner height and which extends, in a longitudinal direction, between a bottom end and a top end.

The calciner of the calcination installation of the invention presents a lowermost oxidant inlet level at which one or more first oxidant inlets are located, and optionally one or more second oxidant inlet levels located above the lowermost oxidant inlet level in the longitudinal direction, one or more second oxidant inlets being located at each second oxidant inlet level present. The first oxidant inlets and, if present, the second oxidant inlets of the calciner are connected to a source of calciner oxidant having an oxygen content of at least 30% vol, preferably at least 50% vol and more preferably at least 88% vol, so that calciner oxidant can be supplied to said oxidant inlets and be injected into the calciner via said oxidant inlets.

The calciner also presents a lowermost fuel inlet level at which one or more fuel inlets are located, and optionally one or more second fuel inlet levels located above the lowermost fuel inlet level in the longitudinal direction, whereby one or more further fuel inlets, referred to as "second fuel inlets" are located at each second fuel inlet level present.

In addition, the calciner presents a flue gas outlet located at the top end of the calciner, a flue-gas recycle inlet located at the bottom end of the calciner and one or more raw meal inlets.

According to the present invention, the configuration of the meal, fuel and calciner oxidant inlets of the calciner is such that, in operation, a low-combustion zone is created within the calciner and so that at least part of the meal is introduced into the calciner at said low-combustion zone.

According to a first option, this is achieved in that the lowermost oxidant inlet level is located above the lowermost fuel inlet level at an oxygen-lean zone distance Do>0 (in the longitudinal direction) from said lowermost fuel inlet, at least one raw meal inlet being located below or at the lowermost oxidant inlet level, preferably below.

According to a second option, this is achieved in that the lowermost fuel inlet level is located above the lowermost oxidant inlet level at a fuel-lean zone distance Df>0 (in the longitudinal direction) from the lowermost oxidant inlet level, at least one raw meal inlet being located below or at the lowermost fuel inlet level.

The oxygen-lean zone distance Do, respectively the fuel-lean zone distance Df, is advantageously between 1/10 and 4/10 of the total calciner height or even more preferably between 2/10 and 3/10 of the total calciner height.

In operation, the flue gas outlet of the calciner is connected to the flue-gas recycle inlet of the calciner via a recycle circuit so as to enable part of the calciner flue gas to be introduced into the calciner via the flue-gas recycle inlet as recycle flue gas. As described above with respect to the calcination method, the recycle circuit may incorporate devices such a raw meal preheater and may as described above, even include a kiln when said kiln is operated with a kiln oxidant containing at least 30% vol of oxygen.

The calcination installation of the invention may thus comprise a raw meal preheater connected to the flue gas outlet, so as to receive calciner flue gas therefrom, and to the one or more raw meal inlets of the calciner, so as to provide preheated raw meal thereto.

In order to enable $CO_2$ valorisation or storage/sequestration, the calcination installation preferably comprises a flue gas purification installation connected to the calciner flue gas outlet, said flue gas purification installation being adapted for removing components other than $CO_2$ from flue gas evacuated from the calciner via the flue gas. When a raw meal preheater is connected to the flue gas outlet so as to receive calciner flue gas therefrom, the flue gas purification installation is preferably connected to the raw meal preheater so as to receive calciner flue gas from the raw meal preheater, the flue gas purification installation being thus indirectly connected to the calciner flue gas outlet.

The present invention also relates to a cement clinker production unit comprising a calcination installation as described above and a clinkerisation kiln, typically a rotary clinkerisation kiln. The clinkerisation kiln is connected to the calcination installation so that meal calcined in the calciner is transferred to the clinkerisation kiln so as to be clinkerized therein.

BRIEF DESCRIPTION OF THE FIGURES

The present invention and its advantages will be better understood in the light of the examples below, reference being made to FIGS. 1 and 2, whereby:
FIG. 2 is a partial schematic representation of an installation suitable for use in the calcination method according to option 2 of the present invention.

DETAILED DESCRIPTION OF THE INVENTION

Figure 1:
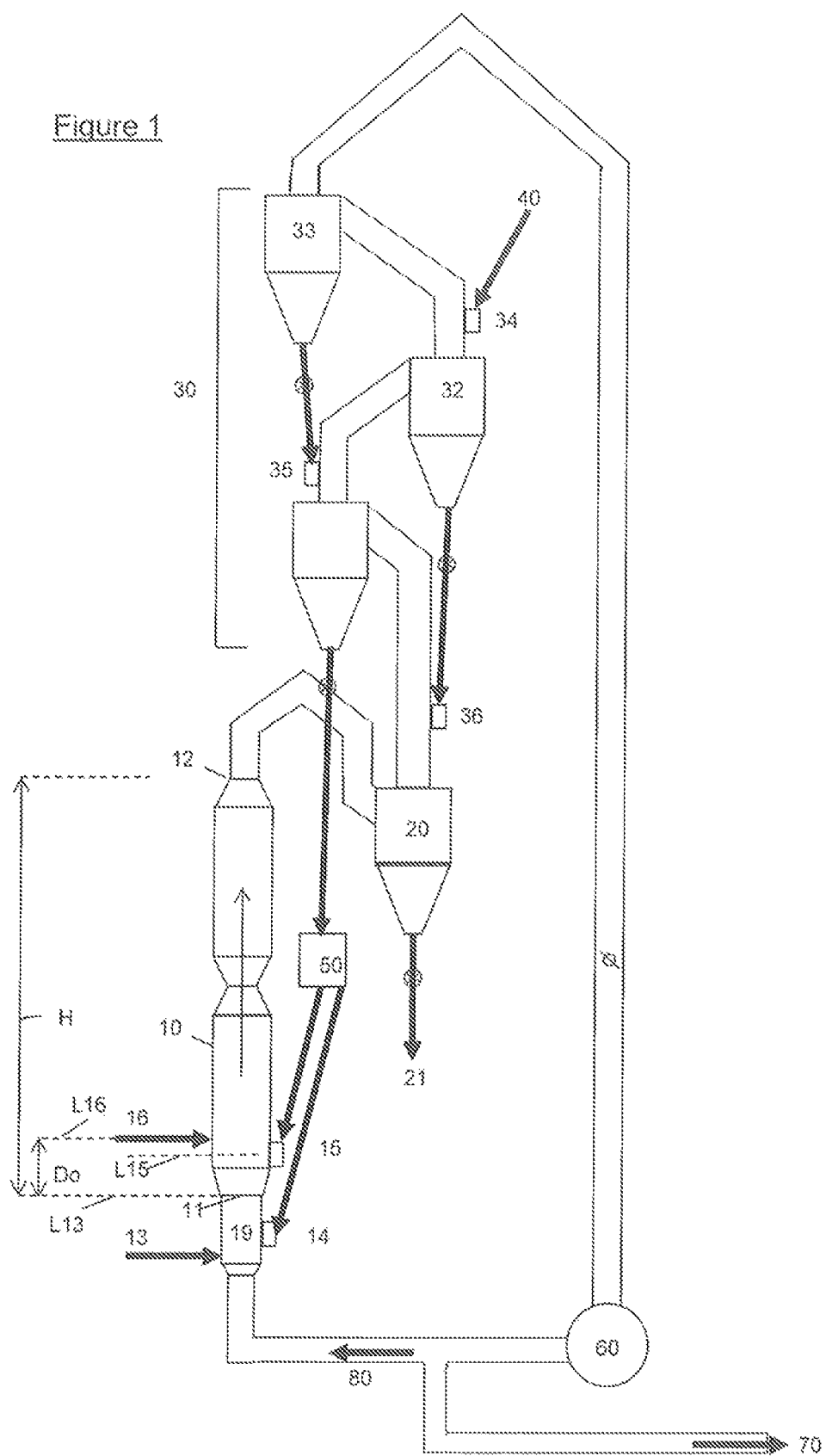
FIG. 1 is a partial schematic representation of an installation suitable for use in the calcination method according to option 1 of the present invention.

FIG. 1 shows a calciner 10 extending, in its vertical longitudinal direction, between a bottom end 11 and a top end 12, the calciner having a total height H.

In the illustrated example, all of the fuel 13 is introduced into a riser duct 19 upstream of bottom end 11. In the present case, the solid fuel 13 is petcoke, but a combination of different fuels, including waste fuels and/or fossil fuels, may be introduced, for example at different locations of the calciner 10.

The illustrated calciner 10 thus has only a single fuel inlet level, i.e. the lowermost inlet level L13, which coincides with the (level of the) bottom end 11 of the calciner, the riser duct connection to the bottom end 11 of the calciner acting as the single fuel inlet L13 into the calciner 10.

All of the calciner oxidant 16 is introduced into the calciner 10 at level L16 via multiple oxidant inlets evenly distributed around the circumference of the calciner 10.

The calciner oxidant 16 has an oxygen content of 99% vol. All of the calciner oxidant 16 is injected into the calciner 10 at level L16, level L16 thus being the sole and lowermost oxidant inlet level of the calciner, the oxidant inlets at level L16 being first oxidant inlets as defined above. Via said first oxidant inlets, the calciner oxidant is introduced into the calciner 10 in an amount sufficient to ensure complete combustion of the overall amount of fuel, while minimizing any excess oxygen in the calciner flue gas.

Do is the oxygen-lean zone distance between the upstream lowermost fuel inlet level L13 and the downstream lowermost oxidant inlet level L16. The zone in the calciner 10 between the lowermost fuel inlet level L13 and lowermost oxidant inlet level L16, i.e. between bottom end 11 and level L16, is an oxygen-lean zone in which little or no fuel combustion takes place.

A first portion 14 of (preheated) raw meal is injected into riser duct 19 upstream of calciner 10. This first portion 14 of the raw meal is thus introduced into the calciner 10 via its bottom end 11 where it enters said oxygen-lean zone. The remainder 15 of the (preheated) raw meal is injected into the oxygen-lean zone of calciner 10 via a raw meal inlet positioned at level L15 downstream of the lowermost fuel inlet level L13 and upstream of the lowermost oxygen inlet level L16.

The raw meal 14, 15 introduced into the calciner 10 is entrained towards the top end 12 of the calciner 10 by an upward gas flow. During its upward passage through the calciner 10, the raw meal is at least partially, and in fact for at least 92%, calcined under the influence of heat generated by the burning of the fuel 13 with the calciner oxidant 16 and by any heat introduced into the calciner 10 by means of recycle flue gas. In the present context partially and totally calcined cement meal leaving the calciner are indiscriminately referred to as "calcined meal". The calcined meal is evacuated from the calciner 10 via its top end 12 together with the calciner flue gas.

The upstream gas stream which entrains the raw meal comprises fumes generated by the burning of the fuel 13 and decarbonation gas ($CO_2$) generated by the decarbonation of the raw meal 14, 15. As will be explained hereinbelow, the upstream gas stream further comprises recycle flue gas.

From the top end 12 of the calciner 10, the calciner flue gas and the calcined meal are transported to a first cyclone, separation cyclone 20, in which the calcined meal 21 is separated from the calciner flue gas.

From separation cyclone 20, the separated calcined meal 21 is typically transported to a rotary clinkerization kiln (not represented) for the production of clinker. In the case of partial oxy-firing, combustion takes place in the rotary kiln with an oxidant having an oxygen content of less than 30% vol. From separation cyclone 20, the separated calciner flue gas is introduced into raw meal preheater tower 30 which comprises three further cyclones 31, 32, 33 through which the separated calciner flue gas flows in succession. Raw meal 40 to be preheated is introduced in the gas outlet of middle cyclone 32 via inlet 34 from where it is entrained by the gas flow into top cyclone 33. From top cyclone 33, the partially preheated raw meal is introduced into the gas outlet of bottom cyclone 31 (of the preheater tower 30) via inlet 35 from where it is entrained to middle cyclone 32. From middle cyclone 32, the raw meal is introduced into the gas outlet of separation cyclone 20 via inlet 36 from where it is entrained to bottom cyclone 31 of tower 30, whereafter the preheated raw meal is sent to meal splitter 50 before being introduced into calciner 10 as described above, i.e. indirectly via riser duct 19 and directly into calciner 10 at level L15.

Extractor fan 60 extracts the calciner flue gas from top cyclone 33. Downstream of extractor fan 60 the calciner flue gas is split into two streams, a first stream 70, which is removed from the system and sent for downstream flue gas processing, and a second stream 80 of recycle flue gas which is recycled and introduced into calciner 10 via riser duct 19 and bottom end 11, as part of the upward gas flow in the calciner. If appropriate, the recycle flue gas 80 can be preheated before being reintroduced into calciner 10 (not illustrated). In the given example, the recycle flue gas 80 was introduced into the calciner at a temperature of 800 to 900° C.

As mentioned above, the cement production installation may comprise a second raw meal preheater (not shown), which is, for example, fed with the flue gas of the rotary kiln.

FIG. 2 shows an installation similar to the one shown in FIG. 1, but in which cement raw meal is calcined using the method of calcining cement raw meal according to the second option of the invention.

In the illustrated example, all of the calciner oxidant 16' is introduced into the riser duct 19 upstream of bottom end 11. Calciner 10 thus has only a single oxidant inlet level, i.e. the lowermost inlet oxidant level L16', which coincides with the bottom end 11 of the calciner 10, the riser duct connection to the bottom end 11 of the calciner acting as the single oxidant inlet into the calciner 10.

All of the fuel 13' is introduced into the calciner 10 at level L13' via a single fuel inlet or via multiple fuel inlets evenly distributed around the circumference of the calciner 10. Level L13' is thus the sole and lowermost fuel inlet level of the calciner.

Df is the fuel-lean zone distance between the upstream lowermost oxidant inlet level L16' and the downstream lowermost fuel inlet level L13', i.e. between the bottom end 11 and the lowermost fuel inlet level L13'. The zone in the calciner 10 between the bottom end 11 of the calciner 10 and level L13' is a fuel-lean zone in which no fuel combustion takes place.

Again, a first portion 14 of (preheated) raw meal is injected into riser duct 19 upstream of calciner 10. This first portion 14 of the raw meal is thus introduced into the calciner 10 via its bottom end 11 where it enters said fuel-lean zone. The remainder 15 of the (preheated) raw meal is injected into the oxygen-lean zone of calciner 10 via a raw meal inlet positioned at level L15 downstream of the lowermost oxidant inlet level L16' and upstream of the lowermost fuel inlet level L13'.

Apart from the above, the process and installation features are analogous to those of the previous example. Both options of the method according to the invention enable operation of the calciner 10 without any deterioration of the process due to material build-ups inside said calciner 10 while maintaining a high level of calcination. When, however, under otherwise similar process conditions, fuel, calciner oxidant and raw meal were introduced into calciner 10 with a configuration of the meal, fuel and calciner oxidant inlets and injection ratios known from the state of the art and not corresponding to a configuration according to the present invention, the process efficiency started to deteriorate within a few hours of operation due to increasing levels of material build-up in the calciner 10.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A calcination installation for calcining cement raw meal, the installation comprising a calciner having a total calciner height and extending between a bottom end and a top end in a longitudinal direction, the calciner comprising:
   a lowermost oxidant inlet level at which one or more first oxidant inlets are located, and optionally one or more second oxidant inlet levels located above the lowermost oxidant inlet level in the longitudinal direction and at which one or more second oxidant inlets are located, said first oxidant inlets and, if present, said second oxidant inlets being connected to a source of calciner oxidant having an oxygen content of at least 30% vol;
   a lowermost fuel inlet level at which one or more first fuel inlets are located;
   a flue gas outlet located at the top end of the calciner;
   a flue-gas recycle inlet located at the bottom end of the calciner; and
   one or more raw meal inlets, wherein:
      the lowermost oxidant inlet level is located above the lowermost fuel inlet level at an oxygen-lean zone distance Do>0 from said lowermost oxidant inlet in the longitudinal direction, at least one raw meal inlet being located below or at the lowermost oxidant inlet level in the longitudinal direction,;
      at least one raw meal inlet is located below or at the lowermost oxidant inlet level in the longitudinal direction; and
      the oxygen-lean zone distance Do is between $1/10$ and $4/10$ of the total calciner height.

2. The calcination installation of claim 1, further comprising a raw meal preheater connected to the flue gas outlet and to the one or more raw meal inlets of the calciner.

3. The calcination installation of claim 2, further comprising a flue gas purification installation connected to the flue gas outlet of the calciner, said flue gas purification installation being adapted for removing components other than $CO_2$ from flue gas evacuated from the calciner via the flue gas outlet.

4. A cement clinker production unit comprising a calcination installation of claim 1 and a clinkerisation kiln, the clinkerization kiln being connected to the calcination installation so that meal calcined in the calciner is transferred to the clinkerization kiln.

* * * * *